United States Patent
Bucci

(10) Patent No.: US 6,786,400 B1
(45) Date of Patent: Sep. 7, 2004

(54) MULTIPLE ACCOUNT BANKING SYSTEM AND METHOD

(75) Inventor: Michael Vincent Bucci, Glen Allen, VA (US)

(73) Assignee: Capital One Financial Corporation, Falls Church, VA (US)

( * ) Notice: Subject to any disclaimer, the term of this patent is extended or adjusted under 35 U.S.C. 154(b) by 0 days.

(21) Appl. No.: 10/236,143

(22) Filed: Sep. 6, 2002

(51) Int. Cl.[7] .............................................. G06K 5/00
(52) U.S. Cl. ...................................... 235/380; 235/382
(58) Field of Search ................................ 235/380, 375, 235/449, 382, 379; 705/26, 39, 35, 36

(56) References Cited

U.S. PATENT DOCUMENTS

| | | | | | |
|---|---|---|---|---|---|
| 5,661,284 | A | * | 8/1997 | Freeman et al. ............. | 235/380 |
| 6,000,608 | A | * | 12/1999 | Dorf ............................ | 235/380 |
| 6,189,787 | B1 | * | 2/2001 | Dorf ............................ | 235/380 |
| 6,315,195 | B1 | * | 11/2001 | Ramachandran ............. | 235/380 |
| 6,598,028 | B1 | * | 7/2003 | Sullivan et al. ................ | 705/35 |
| 2003/0115135 | A1 | * | 6/2003 | Sarfaz et al. .................. | 705/39 |

* cited by examiner

*Primary Examiner*—Thien M. Le
(74) *Attorney, Agent, or Firm*—Baker & McKenzie

(57) ABSTRACT

A system and method that offers a consumer the option to pay for a transaction at a point-of-sale or to conduct a transaction at an automated teller machine using either a credit line or funds in an account, both the credit line and the funds being available upon using a single card. The credit line and the funds can be associated with the same or different financial institutions.

45 Claims, 4 Drawing Sheets

MULTIPLE ACCOUNT BANKING SYSTEM AND METHOD

FIELD

The present application relates to transaction processing and, more particularly, to a system and method that adds functionally to a debit option and a credit option at a point-of-sale terminal and at an automated teller machine. This increased functionality enables a consumer to access multiple accounts with a single card.

BACKGROUND

Credit cards and debit cards are commonly used by consumers due in part to the convenience. As a result, many consumers carry at least one credit card and at least one debit card with them at all times. These consumers can decide at a point-of-sale whether to pay using a credit card or a debit card depending on whether the respective consumer wants the transaction amount added to a credit card account balance or debited from a checking account or other account associated with the debit card. Some debit cards even include a credit logo, such as a Visa© logo or a MasterCard© logo. This functionality enables consumers to use debit cards at retail terminals, for telephone orders and e-commerce web sites where the use of a personal identification number ("PIN") is not available. When a consumer, however, presents a debit card having such functionality to a merchant to conduct a transaction, the transaction amount is debited from an associated account, such as a checking account.

FIGS. 1 and 2 illustrate a prior art system for processing an attempted point-of-sale transaction using a debit card having a credit logo. After the consumer's card is read at point-of-sale terminal 105, display 110 presents two options to the consumer, i.e., debit option 120 and credit option 125. Using, for example, selectors 115a, 115b on POS terminal 105 or another device coupled thereto, the consumer selects either debit option 120 using selector 115a or credit option 125 using selector 115b. Regardless of whether the consumer selects debit option 120 or credit option 125, the transaction amount is debited from the same account 220 with financial institution 215, the account 220 being associated with the debit card, as shown in FIG. 2. Specifically, if the consumer selects debit option 120, transaction data is routed through bank network 205 to financial institution 215. On the other hand, if the consumer selects credit option 125, the transaction data is routed through credit network 210 to financial institution 215. With both selections, the transaction amount is debited from account 220 by financial institution 215. At the point-of-sale, however, the consumer's experience is different depending on which option was selected. In particular, the consumer is required to enter a PIN at the point-of-sale before the transaction data is transmitted, if the consumer selects debit option 120, whereas if the consumer selects credit option 125, the consumer does not have to enter a PIN, but is typically required to sign a receipt.

Accordingly, there is a need for an account with a financial institution allowing a consumer to choose a debit option or a credit option at a point-of-sale or at an automated teller machine, but have the transaction amount either debited from an associated account or added to an associated credit line balance, respectively, depending on the consumer's selection at the point-of-sale or the automated teller machine.

SUMMARY OF THE INVENTION

An aspect of the present application provides for a multi-functional card associated with a first financial institution. The multi-functional card comprises a magnetized data portion having account data, the magnetized data portion operable for a consumer to conduct at least one transaction at a point-of-sale using money withdrawn from an account associated with the first financial institution or a second financial institution, if the consumer selects a debit option at a point-of-sale terminal, and to conduct at least one other transaction at a point-of-sale using a line of credit issued by the first financial institution or the second financial institution, if the consumer selects a credit option at the point-of-sale terminal, wherein the point-of-sale terminal transmits transaction data including at least a portion of the account data along one of a plurality of networks depending on whether the consumer selected the debit option or the credit option.

Another aspect of the present application provides for a multi-functional card associated with a first financial institution. The multi-functional card comprises a memory unit for storing account data, and a processing unit coupled to the memory unit, the processing unit operable for a consumer to conduct at least one transaction at a point-of-sale using money withdrawn from an account associated with the first financial institution or a second financial institution, if the consumer selects a debit option at a point-of-sale terminal, and conduct at least one other transaction at a point-of-sale using a line of credit issued by the first financial institution or the second financial institution, if the consumer selects a credit option at the point-of-sale terminal, wherein the point-of-sale terminal transmits transaction data including at least a portion of the account data along one of a plurality of networks depending on whether the consumer selected the debit option or the credit option after at least a portion of the account data stored in the memory unit is read by the processing unit.

A further aspect of the present application provides for a multi-functional card associated with a first financial institution. The multi-functional card comprises a magnetized data portion having account data, the magnetized data portion operable for a consumer to conduct at least one transaction at an automated teller machine to withdraw money from an account associated with the first financial institution or a second financial institution, if the consumer selects a debit option at the automated teller machine, and to conduct at least one other transaction at the automated teller machine to withdraw money using a line of credit issued by the first financial institution or the second financial institution, if the consumer selects a credit option at the automated teller machine, wherein the automated teller machine transmits transaction data along a network, the transaction data including at least a portion of the account data and data indicating whether the customer selected the debit option or the credit option.

A still further aspect of the present application provides for a method for providing a consumer an option to use one card for multiple accounts when conducting a transaction. The method comprises receiving selection data transmitted by a point-of-sale terminal, the selection data associated with an attempted transaction and including at least an amount of the transaction, determining whether the consumer selected a debit option or a credit option at the point-of-sale terminal, and processing the transaction in accordance with the consumer selection.

An even further aspect of the present application provides for a method for providing a consumer an option to use one card for multiple accounts when conducting a transaction. The method comprises receiving selection data transmitted by an automated teller machine, the selection data associated with an attempted transaction and including at least an amount of the transaction, determining whether the consumer selected a debit option or a credit option at the automated teller machine, and processing the transaction in accordance with the consumer selection.

An additional aspect of the present application provides for a system for providing a consumer an option to use one card for multiple accounts when conducting a transaction, The system comprises a determination unit associated with a financial institution and adapted to communicate with a point-of-sale terminal through a debit network and a credit network and an automated teller machine through the debit network, the determination unit being further adapted to receive transaction data from the point-of-sale terminal and the automated teller machine, and a memory unit electrically connected to the determination unit encoded with instructions for performing the following: determining whether the consumer selected a debit option or a credit option at the point-of-sale terminal at least based on whether the transaction data was transmitted via the bank network or the credit network, respectively, and determining whether the consumer selected a debit option or a credit option at the automated teller machine at least based on a portion of the transaction data indicating the selection, and processing the transaction data in accordance with the consumer selection so that a first account associated with the financial institution is debited if the consumer selected the respective debit option and a second account associated with the financial institution is credited if the consumer selected the respective credit option.

An aspect of the present application provides for a system for providing a consumer an option to use one card for multiple accounts when conducting a transaction. The system comprises a determination unit associated with a first financial institution and adapted to communicate with a point-of-sale terminal through a debit network and a credit network and an automated teller machine through the debit network, the determination unit being further adapted to receive transaction data from the point-of-sale terminal and the automated teller machine, and a memory unit electrically connected to the determination unit encoded with instructions for performing the following: determining whether the consumer selected a debit option or a credit option at the point-of-sale terminal at least based on whether the transaction data was transmitted via the bank network or the credit network, respectively, and determining whether the consumer selected a debit option or a credit option at the automated teller machine at least based on a portion of the transaction data indicating the selection, processing the transaction data in accordance with the consumer selection if the consumer selected one of the two options, and transmitting at least a portion of the transaction data to a second financial institution for processing if the consumer selected the other option.

DETAILED DESCRIPTION

In the exemplary embodiments of the present application, a consumer has the ability to access multiple accounts with a single card. These accounts can represent multiple credit and savings vehicles including, but not limited to, standard credit card accounts, personal lines of credit, home equity lines of credit, savings accounts, checking accounts and money market accounts. These accounts may reside within one financial institution. Alternatively, these accounts may exist in separate financial institutions with appropriate linkages.

When multiple accounts reside in a single financial institution, the consumer would be required to designate specific accounts to be accessed based upon the selection of "credit" or "ATM/debit" at, for example, a point-of-sale ("POS") terminal. Where the accounts reside in multiple financial institutions, the consumer would have to provide appropriate information to the institution that issues the card to allow that issuer to retrieve funds from the other financial institution. The information typically includes ABA and DDA routing information. As will be appreciated be a person having ordinary skill in the art, an ABA transit number is a unique identifying number assigned to each bank by the American Bankers Association National Numerical System and DDA routing information pertains to a merchant's demand deposit account, otherwise known as a merchant's home town bank account.

Figure 1:
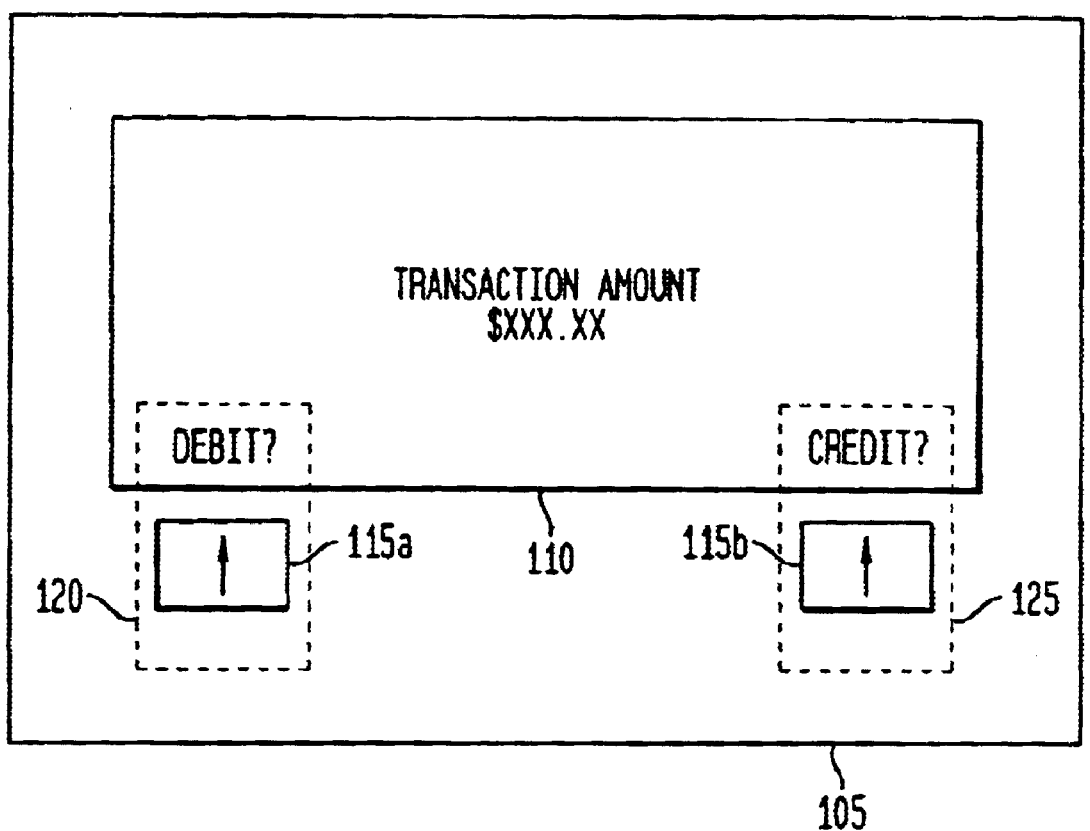
FIG. 1 illustrates a prior art display screen of a point-of-sale terminal.
Figure 2:
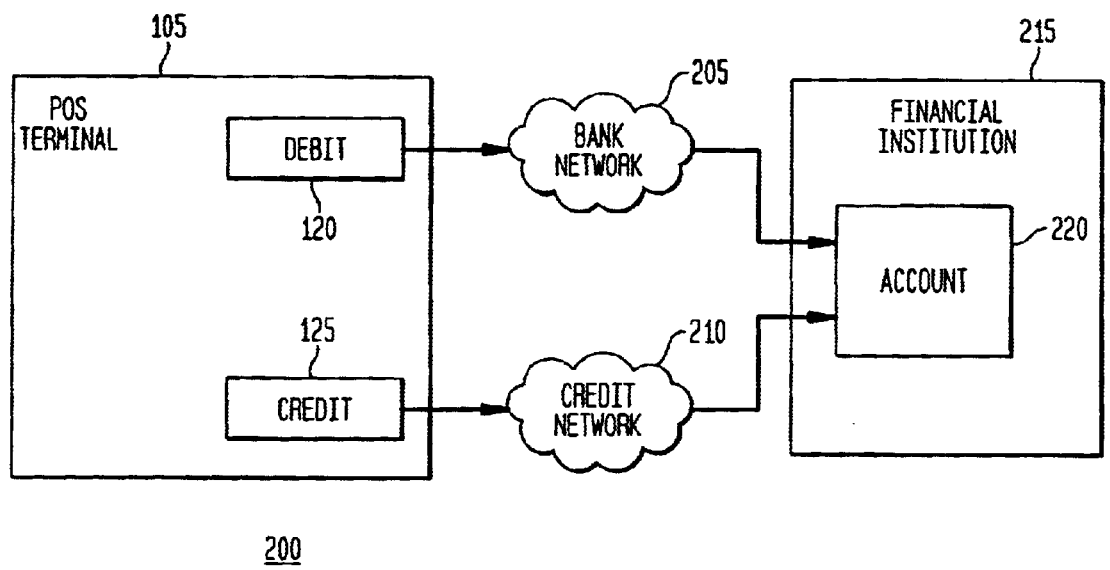
FIG. 2 illustrates a prior art payment system for using a debit card having a credit logo.
Figure 3:
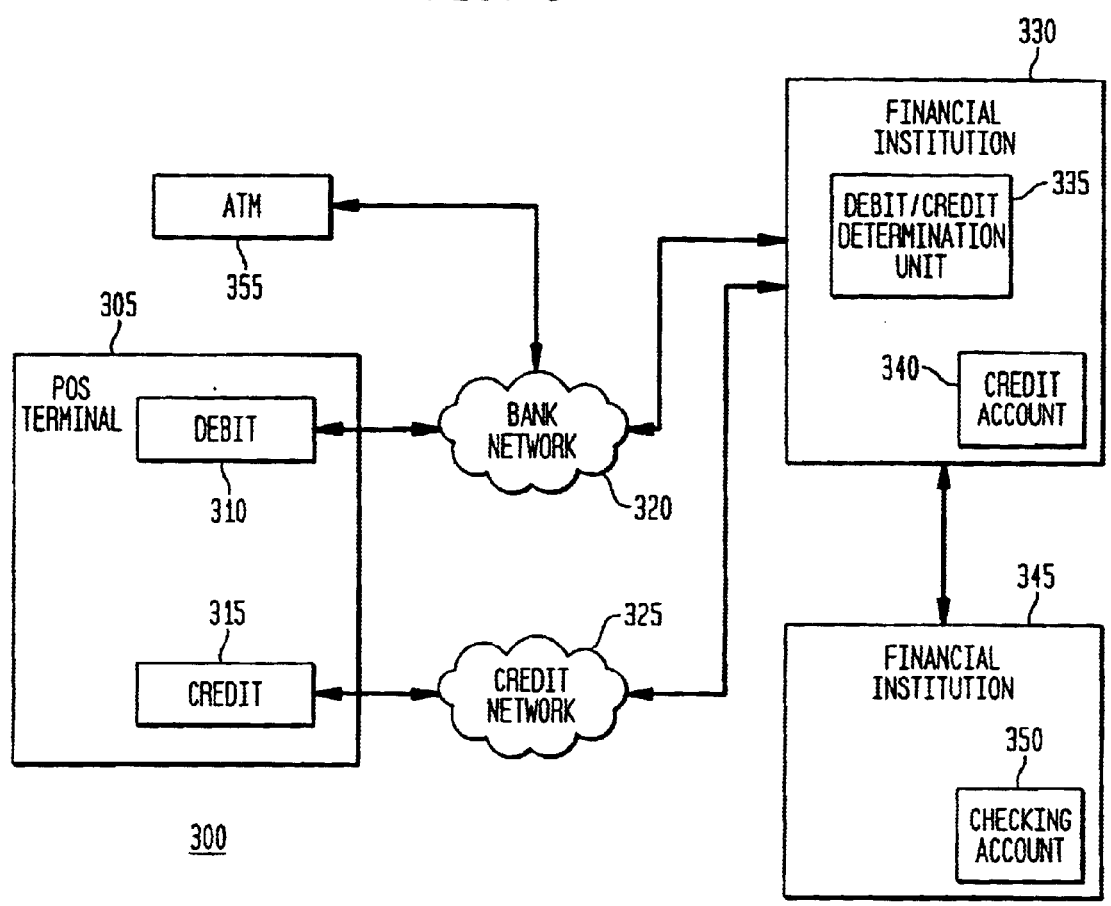
FIG. 3 illustrates an exemplary payment system of the present application.

FIG. 3 depicts an exemplary payment system 300 of the present application including POS terminal 305 coupled to bank network 320 and credit network 325. POS terminal 305 is capable of presenting debit option 310 and credit option 315 to a consumer during a transaction. POS terminals are well known in the art and are commonly used by merchants and others for credit card processing, debit card processing and smart card processing, and, thus, are not described in detail herein. Additionally, bank network 320 and credit network 325 are well known in the art and are commonly used by merchants and others for credit card processing, debit card processing and smart card processing, and, thus, are also not described in detail herein.

Payment system 300 includes financial institution 330 and financial institution 345, financial institution 330 being coupled to POS terminal 305 via bank network 320 and credit network 325. Financial institution 330 and financial institution 345 can be a bank, credit card, personal loan, mortgage or brokerage company or any other type of lender. Similarly, automated teller machine ("ATM") 355 is coupled to financial institution 330 via bank network 320. As can be seen in FIG. 3, financial institution 330 and financial institution 345 are linked together so that data can be transmitted between the respective financial institutions for approving/denying transactions and updating accounts accordingly.

Depending on whether the consumer selects debit option 310 or credit option 315 at POS terminal 305, transaction data is transmitted to financial institution 330 via bank network 320 and or credit network 325. The ability for financial institution 330 to discern the network that presented the transaction data gives financial institution 330 the ability to differentiate the customer intent and the appropriate actions to take for that transaction. This ability enables financial institution 330 to provide to the consumer the capability to access multiple accounts within a single institution, for instance, credit account 340 and at least one other account associated with financial institution 330 not shown in the drawings, or to access an account outside of the respective institution, for example, checking account 350.

Financial institution 330 includes debit/credit determination unit 335 for determining whether the consumer selected debit option 310 or credit option 315, as described in more detail below. Further, financial institution 330 manages credit account 340 of the consumer, credit account 340 being associated with a card or other product issued by financial institution 330 to the consumer, and financial institution 345 manages checking account 350 of the consumer, account 350 being linked with the same card or other product issued by financial institution 330 to the consumer. Even though account 350 is described herein as a checking account, account 350 can be any type of account the funds or credit line of which are electronically accessible.

The components of FIG. 3 may be implemented through hardware, software, and/or firmware. Further, the number of components in payment system 300 is not limited to what is illustrated.

Figure 4:
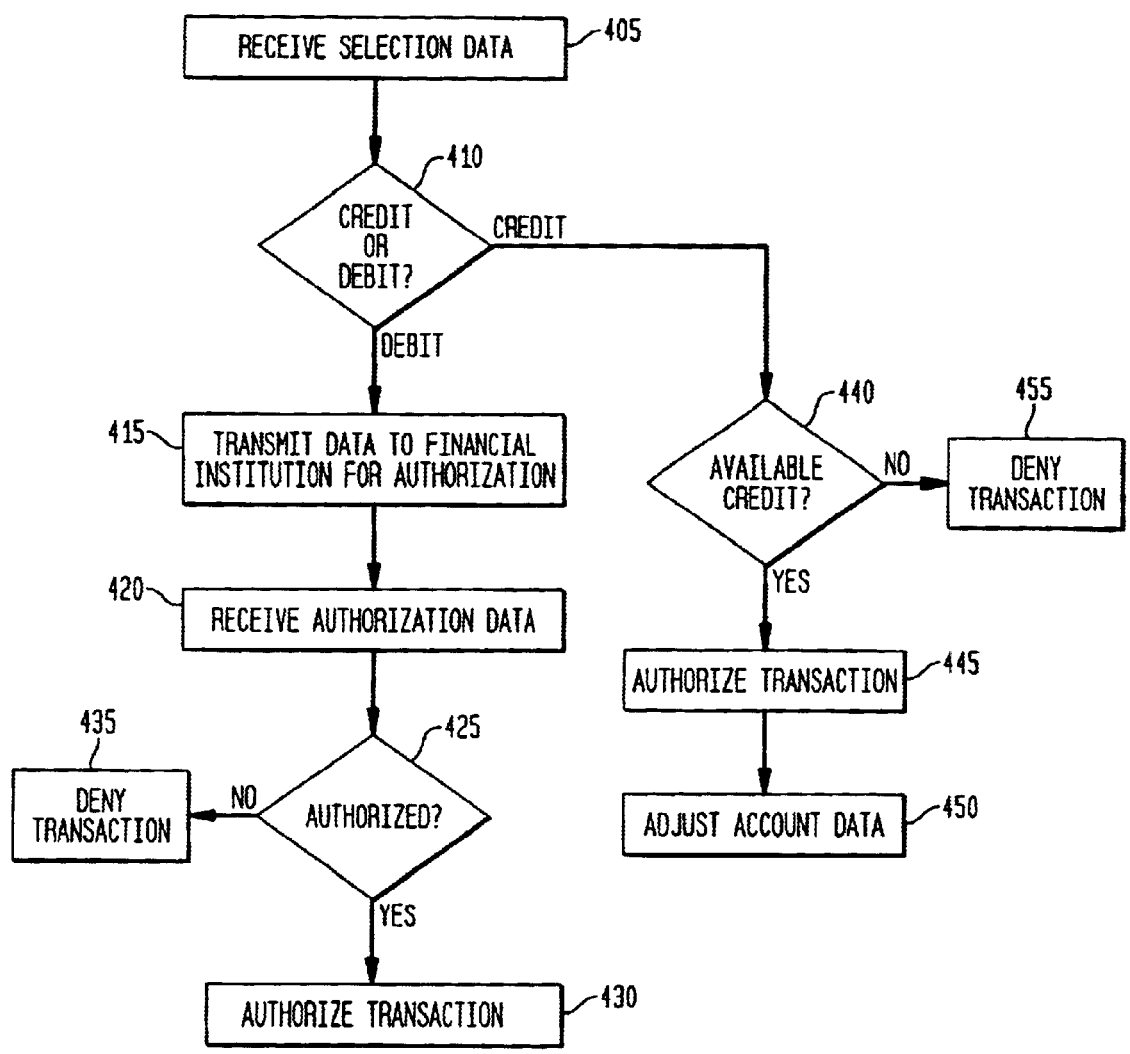
FIG. 4 illustrates an exemplary flow diagram whereby a consumer can select one of a plurality of accounts for funding a transaction at a point-of-sale or conducting a transaction at an automated teller machine.

FIG. 4 illustrates an exemplary flow diagram whereby a consumer can select one of a plurality of accounts associated with a card for funding a transaction or for receiving money. Even though the exemplary embodiments of the present application are described with reference to presenting a card at a POS terminal or an ATM, the present application is not limited to a consumer using a card or other product as described above to access funds in and/or credit line associated with one of a plurality of accounts. Rather, the consumer can present a predetermined number at a point-of-sale, for instance, an account number or card number, in lieu of a card. The financial institution may not issue a physical card for the respective type of account or accounts managed by the financial institution.

When a consumer presents a card at a point-of-sale in order to pay for a purchase or at an ATM, data is read from the card. For example, data is read from a magnetized strip on the card or if the card is a smart card or the like, the data is read from an internal memory unit interacting with an internal processing unit located of the smart card. Also, as described above, as opposed to reading the data from the card, a predetermined number can be input into POS terminal 305 or a device coupled thereto or into ATM 355. At POS terminal 305 at least two options are displayed to the consumer. The two options are debit option 310 and credit option 315, as shown in FIG. 3. The consumer then decides whether the consumer wants the transaction amount to be withdrawn from checking account 350 at financial institution 345 or added to a credit line balance of credit account 340 at financial institution 330.

The consumer or other individual then makes a selection, for example, by pressing an appropriate button on POS terminal 305 or a device coupled thereto and transaction data reflecting the selection made by the consumer is received by financial institution 330 from POS terminal 305, in 405. If the consumer selected debit option 310, transaction data is transmitted to financial institution 330 via bank network 320, whereas if the consumer selected credit option 315, transaction data is transmitted to financial institution 330 via credit network 325. In an exemplary embodiment, transaction data includes data indicating, for instance, a card number and/or an account number, a transaction amount, the selection made by the consumer, a PIN and/or other verification data. Debit/credit determination unit 335 receives at least a portion of the transmitted data and determines whether the consumer selected debit option 310 or credit option 315, in 410. Debit/credit determination unit 335 determines that the consumer selected debit option 310 if the data was transmitted via bank network 320 and debit/credit determination unit 335 determines that the consumer selected credit option 315 if the data was transmitted via credit network 325. After the data is received by financial institution 330, the consumer at the point-of-sale is identified by matching a received card number and/or account number with data associated with the consumer stored in a memory unit associated with financial institution 330 and/or financial institution 345.

As will be appreciated by a person having ordinary skill in the art, ATM 355 is operable to present to a consumer two or more options. Such options can pertain to one or more savings, checking and credit accounts. Based on the selection made by the consumer, transaction data transmitted via bank network 320 includes account data and data indicating the selection made by the consumer at ATM 355, for instance, whether the consumer selected a debit option or a credit option. If ATM 355 offers multiple debit (and/or credit) options to a consumer, the transmitted data further indicates which of the debit options were chosen, for example, whether the consumer selected an option pertaining to a savings account or a checking account. In an exemplary embodiment, data stored in at least one field of a data string indicates the consumer's selection and the data is evaluated by debit/credit determination unit 335.

If debit/credit determination unit 335 determines that the consumer selected credit option 315, financial institution 330 processes that transaction as it would normally process any credit transaction, including a determination whether the consumer has available credit associated with credit account 340 greater than or equal to the transaction amount, in 440. If it is determined that there is not enough available credit, the attempted transaction is denied by financial institution 330 and data reflecting the transaction rejection is transmitted from financial institution 330 to POS terminal 305 via credit network 325, in 455. Alternatively, the transaction is not denied, but rather the consumer is authorized to charge more than the credit limit associated with credit account 340. If, on the other hand, financial institution 330 determines that available credit does exist in credit account 340, the attempted transaction is approved and data reflecting the transaction approval is transmitted from financial institution 330 to POS terminal 305 via credit network 325, in 445. Thereafter, account data associated with credit account 340 is updated, in 450, for instance, by increasing a credit line balance by an amount at least equal to the transaction amount.

If debit/credit determination unit 335 determines that the consumer selected debit option 310, then financial institution 330 transmits data including, for instance, an account number and a transaction amount, to financial institution 345 linked to financial institution 330, so that financial institution 345 can at least determine whether checking account 350 has funds greater than or equal to the attempted transaction amount, in 415. If checking account 350 has a credit line, such as overdraft protection, associated therewith and the transaction amount is greater than the available funds, then the transaction amount is added to a credit line balance. Financial institution 330 receives authorization data from financial institution 345, in 420. The authorization data indicates either approval of the attempted transaction or denial of the attempted transaction. If the transaction is determined to be authorized, in 425, financial institution 330 transmits data indicating authorization to POS terminal 305, in 430. If the transaction is not authorized, in 425, financial institution 330 transmits data indicating denial to POS terminal 305, in 435. Alternatively, financial institution 345 transmits data indicating authorization or denial directly to POS terminal 305. In an exemplary embodiment, data indicating whether a transaction is authorized or denied is transmitted via the same network as the authorization request. As described herein, credit account 340 and checking account 350 can be with the same financial institution, such as financial institution 330, and, as a result, that financial institution would authorize or deny a request transmitted via bank network 320 or credit network 325.

Financial institution 330 and/or financial institution 345 also perform additional authorization inquiries not described herein, for example, verifying that an inputted PIN is correct by matching the PIN with data associated with the respective consumer stored in a memory unit. Other authorization inquires can be performed besides or in addition to PIN verification.

The present application is not limited to point-of-sale transactions. Rather, the exemplary embodiments are equally applicable to web-based purchases and purchases using a telephone whereby a consumer has the option of selecting debit or credit after providing a card number and/or an account number to, for example, a merchant.

Moreover, as described above, a consumer can input a card at ATM 355 to withdraw money from one or more associated bank accounts, such as checking, savings or money market accounts, and/or from one or more associated credit accounts. The consumer's experience at ATM 355 is similar to the consumer's experience at POS terminal 305, described above. Particularly, in response to a plurality of options presented to the consumer on a display screen of ATM 355, the consumer has the ability to select from more than one type of account including, but not limited to, either credit account 340 or checking account 350 for the transaction. Accordingly, the consumer can either withdraw money from a credit account or a banking account, respectively. Similarly, if ATM 355 provides the functionality to pay bills, the consumer can pay one or more bills using funds in a bank account or a credit line associated with a credit account. Any bank account and credit account accessible via ATM 355 can be with the same financial institution associated with the card used at the ATM or can be different financial institutions.

Further, as described above, a physical card having an associated card number may be issued to a consumer to be presented at a point-of-sale, over a communication device, such as a telephone, or via an Internet connection. The card can be a credit card, debit card, smart card, ATM card or other card. Regardless of the type of card or which financial institution issued the card, the card or the card number is operable for the consumer to access both a credit account having a credit line and an account being funded with money, for instance, a checking, savings or money market account. The accounts may be with the same financial institution or separate financial institutions.

The embodiments described above are illustrative examples of the present invention and it should not be construed that the present invention is limited to these particular embodiments. Various changes and modifications may be effected by one skilled in the art without departing from the spirit or scope of the invention as defined in the appended claims.

What is claimed is:

1. A conventional debit card associated with a first financial institution, comprising:

a magnetized data portion having account data, the magnetized data portion operable for a consumer to conduct at least one transaction at a point-of-sale using a line of credit issued by the first financial institution or a second financial institution, if the consumer selects a credit option at a point-of-sale terminal after the magnetized data portion is read at the point-of-sale, wherein the point-of-sale terminal transmits transaction data including at least a portion of the account data along one of a plurality of networks if the consumer selected the credit option.

2. The conventional debit card as set forth in claim 1, wherein the first financial institution is a credit card issuer and the second financial institution is a bank.

3. The conventional debit card as set forth in claim 1, wherein the first financial institution is a bank and the second financial institution is a credit card issuer.

4. The conventional debit card as set forth in claim 3, wherein the magnetized data portion is also operable for the consumer to conduct at least one transaction at the point-of-sale using money withdrawn from an account associated with the first financial institution or the second financial institution, if the consumer selects a debit option at the point-of-sale terminal, the account being a checking account.

5. The conventional debit card as set forth in claim 3, wherein the magnetized data portion is also operable for the consumer to conduct at least one transaction at the point-of-sale using money withdrawn from an account associated with the first financial institution or the second financial institution, if the consumer selects a debit option at the point-of-sale terminal, the account being a savings account.

6. The conventional debit card as set forth in claim 3, wherein the magnetized data portion is also operable for the consumer to conduct at least one transaction at the point-of-sale using money withdrawn from an account associated with the first financial institution or the second financial institution, if the consumer selects a debit option at the point-of-sale terminal, the account being a money market account.

7. The conventional debit card as set forth in claim 1, wherein the magnetized data portion is also operable for the consumer to conduct at least one transaction at the point-of-sale using money withdrawn from an account associated with the first financial institution or the second financial institution, if the consumer selects a debit option at the point-of-sale terminal, the account being a certificate of deposit account.

8. The conventional debit card as set forth in claim 1, wherein the magnetized data portion is also operable for the consumer to conduct at least one transaction at the point-of-sale using money withdrawn from an account associated with the first financial institution or the second financial institution, if the consumer selects a debit option at the point-of-sale terminal, the account being a home equity account.

9. A transaction card associated with a first financial institution, comprising:

a memory unit for storing account data; and a processing unit coupled to the memory unit, the processing unit operable for a consumer to conduct at least one transaction at a point-of-sale using a line of credit issued by the first financial institution or a second financial institution when the transaction card is operating as a debit card, if the consumer selects a credit option at a point-of-sale terminal, wherein the point-of-sale terminal transmits transaction data including at least a portion of the account data along one of a plurality of networks if the consumer selected the credit option after at least a portion of the account data stored in the memory unit is read by the processing unit.

10. A conventional debit card associated with a first financial institution, comprising:

a magnetized data portion having account data, the magnetized data portion operable for a consumer to conduct at least one transaction at an automated teller machine to withdraw money using a line of credit issued by the first financial institution or a second financial institution, if the consumer selects a credit option at the automated teller machine after the magnetized data portion is read by the automated teller machine, wherein the automated teller machine transmits transaction data along a network, the transaction data including at least a portion of the account data and data indicating that the customer selected the credit option.

11. A method for providing a consumer an option to use a conventional debit card for accessing multiple accounts, the method comprising:

receiving selection data transmitted by a point-of-sale terminal after the conventional debit card is read at the point-of-sale terminal, the selection data associated with an attempted transaction and including at least an amount of the transaction;

determining if the consumer selected a credit option at the point-of-sale terminal; and processing the transaction in accordance with the consumer selection by accessing a line of credit associated with one of the multiple accounts, if the consumer selected the credit option.

12. The method as set forth in claim 11, wherein determining whether the consumer selected a credit option at the point-of-sale terminal includes determining whether the selection data was transmitted via a credit network.

13. The method as set forth in claim 11, wherein processing the transaction in accordance with the consumer selection includes determining whether the attempted transaction is approved according to whether the consumer selected the credit option; and transmitting approval data to the point-of-sale terminal indicating whether the transaction was approved.

14. The method as set forth in claim 13, wherein determining whether the attempted transaction is approved includes verifying that an open-to-buy for the line of credit is greater than or equal to the amount of the attempted transaction, if the consumer selected the credit option.

15. The method as set forth in claim 14, wherein the line of credit is associated with a financial institution and a debit account linked to the conventional debit card is associated with another financial institution.

16. A method for providing a consumer an option to use a conventional debit card for accessing multiple accounts, the method comprising:

receiving selection data transmitted by an automated teller machine after the conventional debit card is read by the automated teller machine, the selection data associated with an attempted transaction and including at least an amount of the transaction;

determining if the consumer selected a credit option at the automated teller machine; and processing the transaction in accordance with the consumer selection by accessing a line of credit associated with one of the multiple accounts, if the consumer selected the credit option.

17. A system for providing a consumer an option to use a conventional debit card for accessing multiple accounts, the system comprising:

a determination unit associated with a financial institution and adapted to communicate with a point-of-sale terminal through a debit network and a credit network and adapted to communicate with an automated teller machine through the debit network, the determination unit being further adapted to receive transaction data from the point-of-sale terminal and the automated teller machine; and a memory unit electrically connected to the determination unit and encoded with instructions for performing the following:

determining if the consumer selected a credit option at the point-of-sale terminal at least based on whether the transaction data was transmitted via the credit network, and determining whether the consumer selected a credit option at the automated teller machine at least based on a portion of the transaction data indicating the selection, and processing the transaction data in accordance with the consumer selection so that an account associated with the financial institution is credited if the consumer selected the respective credit option.

18. A system for providing a consumer an option to use a conventional debit card for accessing multiple accounts, the system comprising:

a determination unit associated with a first financial institution and adapted to communicate with a point-of-sale terminal through a debit network and a credit network and adapted to communicate with an automated teller machine through the debit network, the determination unit being further adapted to receive transaction data from the point-of-sale terminal and the automated teller machine; and a memory unit electrically connected to the determination unit and encoded with instructions for performing the following:

determining if the consumer selected a credit option at the point-of-sale terminal at least based on whether the transaction data was transmitted via the credit network, and determining whether the consumer selected a credit option at the automated teller machine at least based on a portion of the transaction data indicating the selection, processing the transaction data in accordance with the consumer selection if the consumer selected another option at the point-of-sale terminal or at the automated teller machine, and transmitting at least a portion of the transaction data to a second financial institution for processing if the consumer selected the respective credit option.

19. The conventional debit card as set forth in claim 1, wherein the point-of-sale terminal reads the conventional debit card.

20. The conventional debit card as set forth in claim 11, wherein the point-of-sale terminal reads the conventional debit card.

21. The transaction card as set forth in claim 9, wherein the first financial institution is a credit card issuer and the second financial institution is a bank.

22. The transaction card as set forth in claim 9, wherein the first financial institution is a bank and the second financial institution is a credit card issuer.

23. The transaction card as set forth in claim 22, wherein the processing unit is also operable for the consumer
to conduct at least one transaction at the point-of-sale using money withdrawn from an account associated with the first financial institution or the second financial institution, if the consumer selects a debit option at the point-of-sale terminal, the account being a checking account.

24. The transaction card as set forth in claim 22, wherein the processing unit is also operable for the consumer
to conduct at least one transaction at the point-of-sale using money withdrawn from an account associated with the first financial institution or the second financial institution, if the consumer selects a debit option at the point-of-sale terminal, the account being a savings account.

25. The transaction card as set forth in claim 22, wherein the processing unit is also operable for the consumer
to conduct at least one transaction at the point-of-sale using money withdrawn from an account associated with the first financial institution or the second financial institution, if the consumer selects a debit option at the point-of-sale terminal, the account being a money market account.

26. The transaction card as set forth in claim 9, wherein the processing unit is also operable for the consumer
to conduct at least one transaction at the point-of-sale using money withdrawn from an account associated with the first financial institution or the second financial institution, if the consumer selects a debit option at the point-of-sale terminal, the account being a certificate of deposit account.

27. The transaction card as set forth in claim 9, wherein the processing unit is also operable for the consumer
to conduct at least one transaction at the point-of-sale using money withdrawn from an account associated with the first financial institution or the second financial institution, if the consumer selects a debit option at the point-of-sale terminal, the account being a home equity account.

28. The transaction card as set forth in claim 10, wherein the first financial institution is a credit card issuer and the second financial institution is a bank.

29. The transaction card as set forth in claim 10, wherein the first financial institution is a bank and the second financial institution is a credit card issuer.

30. The transaction card as set forth in claim 29, wherein the magnetized data portion is also operable for the consumer
to conduct at least one transaction at the automated teller machine using money withdrawn from an account associated with the first financial institution or the second financial institution, if the consumer selects a debit option at the automated teller machine, the account being a checking account.

31. The transaction card as set forth in claim 29, wherein the magnetized data portion is also operable for the consumer
to conduct at least one transaction at the automated teller machine using money withdrawn from an account associated with the first financial institution or the second financial institution, if the consumer selects a debit option at the automated teller machine, the account being a savings account.

32. The transaction card as set forth in claim 29, wherein the magnetized data portion is also operable for the consumer
to conduct at least one transaction at the automated teller machine using money withdrawn from an account associated with the first financial institution or the second financial institution, if the consumer selects a debit option at the automated teller machine, the account being a money market account.

33. The transaction card as set forth in claim 10, wherein the magnetized data portion is also operable for the consumer
to conduct at least one transaction at the automated teller machine using money withdrawn from an account associated with the first financial institution or the second financial institution, if the consumer selects a debit option at the automated teller machine, the account being a certificate of deposit account.

34. The transaction card as set forth in claim 10, wherein the magnetized data portion is also operable for the consumer
to conduct at least one transaction at the automated teller machine using money withdrawn from an account associated with the first financial institution or the second financial institution, if the consumer selects a debit option at the automated teller machine, the account being a home equity account.

35. The method as set forth in claim 16, wherein
determining whether the consumer selected a credit option at the automated teller machine includes evaluating a portion of the transaction data indicating the selection.

36. The method as set forth in claim 16, wherein
processing the transaction in accordance with the consumer selection includes
determining whether the attempted transaction is approved according to whether the consumer selected the credit option; and
transmitting approval data to the automated teller machine indicating whether the transaction was approved.

37. The method as set forth in claim 36, wherein
determining whether the attempted transaction is approved includes verifying that an open-to-buy for the line of credit is greater than or equal to the amount of the attempted transaction, if the consumer selected the credit option.

38. The method as set forth in claim 37, wherein
the line of credit is associated with a financial institution and a debit account linked to the conventional debit card is associated with another financial institution.

39. A method for processing a transaction initiated at a point-of-sale terminal, the method comprising:
identifying a conventional debit card was read at the point-of-sale terminal the conventional debit card having previously been associated with at least two accounts;
determining whether a credit option was selected at the point-of-sale terminal; and
accessing a credit line associated with one of the at least two accounts if the credit option was selected.

40. A method for providing a consumer an option to use a conventional credit card for accessing multiple accounts, the method comprising:

receiving selection data transmitted by an automated teller machine after the conventional credit card is read by the automated teller machine, the selection data associated with an attempted transaction and including at least an amount of the transaction;

determining if the consumer selected a debit option at the automated teller machine; and processing the transaction in accordance with the consumer selection by accessing a debit account associated with one of the multiple accounts.

41. The method as set forth in claim 40, wherein determining whether the consumer selected a debit option at the automated teller machine includes evaluating a portion of the transaction data indicating the selection.

42. The method as set forth in claim 40, wherein processing the transaction in accordance with the consumer selection includes determining whether the attempted transaction is approved according to whether the consumer selected the debit option; and transmitting approval data to the automated teller machine indicating whether the transaction was approved.

43. The method as set forth in claim 42, wherein determining whether the attempted transaction is approved includes verifying the consumer has an amount of money greater than or equal to the amount of the attempted transaction in a banking account, if the consumer selected the debit option.

44. The method as set forth in claim 43, wherein the banking account is associated with a financial institution and a credit account linked to the conventional credit card is associated with another financial institution.

45. A method for processing a transaction initiated at a point-of-sale, the method comprising:

identifying data associated with a conventional debit account was input at the point-of-sale, the conventional debit account having previously been associated with at least one other account;

determining whether a credit option was selected at the point-of-sale; and accessing a credit line associated with the at least one other account if the credit option was selected.

* * * * *